(12) United States Patent
Rolland et al.

(10) Patent No.: US 11,840,029 B2
(45) Date of Patent: Dec. 12, 2023

(54) METHOD FOR MANUFACTURING A COMPOSITE PANEL

(71) Applicant: Safran Nacelles, Gonfreville l'Orcher (FR)

(72) Inventors: Clément Rolland, Gonfreville l'Orcher (FR); Jean Baptiste Delarue, Gonfreville l'Orcher (FR); Jean Jacques Thomas, Gonfreville l'Orcher (FR); Vianney Hus, Gonfreville l'Orcher (FR); Mathieu Preau, Gonfreville l'Orcher (FR); Alain Roussel, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 17/145,903

(22) Filed: Jan. 11, 2021

(65) Prior Publication Data
US 2021/0129462 A1 May 6, 2021

Related U.S. Application Data

(63) Continuation of application No. PCT/FR2019/051708, filed on Jul. 9, 2019.

(30) Foreign Application Priority Data

Jul. 10, 2018 (FR) ........................................ 1856345

(51) Int. Cl.
*B29C 70/48* (2006.01)
*B29C 70/54* (2006.01)
(Continued)

(52) U.S. Cl.
CPC ............ *B29C 70/546* (2013.01); *B29C 70/34* (2013.01); *B29C 70/48* (2013.01); *B32B 3/12* (2013.01);
(Continued)

(58) Field of Classification Search
CPC ...... B29C 70/546; B29C 70/547; B29C 70/48
See application file for complete search history.

(56) References Cited

U.S. PATENT DOCUMENTS 5,104,718 A * 4/1992 Asada ................... B29C 70/547
264/293
5,484,642 A * 1/1996 Bompard ................ B29C 70/48
442/337
(Continued)

FOREIGN PATENT DOCUMENTS

DE 10358295 5/2005
EP 1524105 12/2009
(Continued)

OTHER PUBLICATIONS

International Search Report for International Application PCT/FR2019/051708, dated Oct. 17, 2019.

*Primary Examiner* — Matthew J Daniels
(74) *Attorney, Agent, or Firm* — Burris Law, PLLC (57) ABSTRACT

The present disclosure concerns a method for manufacturing a composite panel including a cellular central core interposed between two skins. The manufacturing method includes the steps of manufacture of an element with a cellular structure comprising a cellular core structure interposed between two layers of structural plies intended to form the skins, positioning of the element with a cellular structure within a mold, formation of drains on either side of the cellular core structure, infusion of the element with a cellular structure so as to impregnate it with a resin, carrying out a draining of the resin through the drains in the element with a cellular structure during the infusion step, the drains having a geometry configured to provide draining, and polymerization of the impregnated element with a cellular structure to form the composite panel.

1 Claim, 4 Drawing Sheets

(51) Int. Cl.
  *B32B 3/12*     (2006.01)
  *B29C 70/34*    (2006.01)
  B29K 309/08     (2006.01)
  B29L 31/60      (2006.01)

(52) U.S. Cl.
  CPC ..... *B29K 2309/08* (2013.01); *B29L 2031/608* (2013.01); *B32B 2262/101* (2013.01)

(56) References Cited

U.S. PATENT DOCUMENTS

| | | | | |
|---|---|---|---|---|
| 5,567,499 | A * | 10/1996 | Cundiff | B29C 70/48 428/116 |
| 5,885,513 | A * | 3/1999 | Louderback | B29C 70/443 264/327 |
| 7,595,112 | B1 * | 9/2009 | Cano | B29C 70/088 428/221 |
| 8,696,965 | B2 * | 4/2014 | Bongiovanni | B29C 70/547 156/286 |
| 2003/0077965 | A1 * | 4/2003 | Mack | B29C 70/24 428/297.4 |
| 2004/0219855 | A1 * | 11/2004 | Tsotsis | B29C 48/05 442/364 |
| 2005/0123717 | A1 * | 6/2005 | Shen | B32B 27/04 428/116 |
| 2010/0086765 | A1 * | 4/2010 | Inston | B29C 70/443 428/311.51 |

FOREIGN PATENT DOCUMENTS

| | | | |
|---|---|---|---|
| EP | 3023236 | 5/2016 | |
| JP | H02227212 A * | 9/1990 | ............ B29B 11/14 |
| WO | 2008118649 | 10/2008 | |
| WO | 2011096935 | 8/2011 | |

* cited by examiner

METHOD FOR MANUFACTURING A COMPOSITE PANEL

CROSS-REFERENCE TO RELATED APPLICATIONS

This application is a continuation of International Application No. PCT/FR2019/051708, filed on Jul. 9, 2019, which claims priority to and the benefit of FR 18/56345 filed on Jul. 10, 2018. The disclosures of the above applications are incorporated herein by reference.

FIELD

The present disclosure relates to the manufacture of composite panels comprising a honeycomb-type cellular central core sandwiched between two skins.

BACKGROUND

The statements in this section merely provide background information related to the present disclosure and may not constitute prior art.

In general, a thrust reverser of a turbojet engine nacelle is often formed with a composite panel having a honey-comb core sandwiched between two skins. This panel type includes at least one aerodynamic face obtained when the used skin is an acoustic skin perforated with a multitude of orifices enabling a fluidic communication between the outside and the inside of the cellular central core of the composite, thus forming an acoustic composite panel.

The manufacture of such a panel may be carried out by several solutions.

A first solution consists in using a method for drape-molding a pre-impregnated and then autoclaved fabric. Nonetheless, such a solution requires gluing of several parts manufactured separately before assembly so as to form the sandwich composite structure.

Another solution consists in using a resin infusion technique. This technique consists in making the composite parts by disposing different layers of materials over a form, and then ensuring the diffusion of a resin inside these different layers for polymerization thereof.

This technique type is implemented in particular in the case of composite panels having one single aerodynamic face so that, to make a composite panel having two aerodynamic faces on either side of said panel, this involves gluing of several parts manufactured separately.

Finally, another known manufacturing method that allows obtaining a part with two aerodynamic faces is liquid resin injection molding, called RTM ("Resin Transfer molding"). This RTM method consists in injecting resin in a dry reinforcement preform under pressure and in a closed mold. Vacuum is often generated in the tooling in order to facilitate the migration of the resin. The main characteristic of this method is that it allows obtaining parts including two perfectly calibrated smooth faces.

Nonetheless, the implementation of this method generally results in the undesirable presence of resin inside the cells. This is particularly detrimental, in particular when the composite panel to be manufactured is intended to form an acoustic attenuation panel.

Indeed, these panels are intended to reduce the noise emissions of the turbojet engines, these panels generally having a sandwich structure comprising an outer, air-permeable, perforated skin (directed towards the source of noise), called "resistive" or "acoustic," whose function is to dissipate the acoustic energy, a honeycomb-type cellular core structure, and an inner skin formed by a solid skin (opposite to the source of noise), called structural.

In this case, the internal space of the pits is particularly significant as each of the cells of the central core forms a Helmholtz resonator.

SUMMARY

This section provides a general summary of the disclosure and is not a comprehensive disclosure of its full scope or all of its features.

The present disclosure provides a simplified manufacture of a composite panel, by substantially reducing the number of manufacturing steps, in particular by avoiding a final step of gluing the elements to one another, while allowing ending with a composite panel whose cells keep the integrity thereof.

To this end, the present disclosure concerns a method for manufacturing a composite panel comprising a cellular central core interposed between two skins.

According to the present disclosure, the manufacturing method comprises the following steps:
  manufacture of an element with a cellular structure comprising a cellular core structure interposed between two layers of structural plies intended to form the skins,
  positioning of the element with a cellular structure within a mold,
  formation of drains on either side of the cellular core structure,
  infusion of the element with a cellular structure so as to impregnate it with a resin,
  carrying out a draining of the resin through the drains in the element with a cellular structure during the infusion step, the drains having a geometry configured to provide draining, and
  polymerization of the impregnated element with a cellular structure to form the composite panel.

By "interposed between two layers of structural plies," it should be understood that the cellular core structure is disposed between two layers of structural plies, elements such as adhesive films may be disposed between the cellular core structure and the layers of structural plies.

Thus, after impregnation of the resin, the set will fit together so as to form only but one single sandwich part.

The "structural plies" comprise fibrous reinforcement plies made for example of carbon (unidirectional or fabric), stacked on top of one another, which after having been impregnated with resin through a so-called LCM (Liquid Composite Molding) method, serve to confer the desired mechanical strength in order to take on the forces being applied on the part to which these belong.

According to one form, the drains are obtained by a stabilization method so as to form corrugations along each face of the element with a cellular structure.

The manufacturing method then comprises a preliminary step of manufacturing a tight cellular core structure before the step of manufacturing an element with a cellular structure including a step of positioning a first stabilization layer over a first face of the cellular core structure and a step of positioning a second stabilization layer over a second face of the cellular core structure, the drains being obtained during a preliminary polymerization step during which the stabilization layers are deformed so as to form corrugations along each face of the element with a cellular structure.

In another form, the two stabilization layers are glued on the peripheral edges of the cellular core structure during the preliminary step of manufacturing the tight cellular core structure.

According to another form, the manufacturing method comprises a preliminary step of manufacturing a preformed cellular core structure before the step of manufacturing an element with a cellular structure including:
- a step of positioning a first deformable element over a mold,
- a step of positioning a first stabilization layer over the first deformable element,
- a step of positioning a first face of the cellular core structure over the first stabilization layer,
- a step of positioning a second stabilization layer over a second face of the cellular core structure,
- a step of positioning a second deformable element over the second stabilization layer, each of the first and second preformed elements comprising a corrugated face intended to be in contact with the respective stabilization layers,
- a step of positioning a counter-mold over the second deformable element,
- a vacuum baking step, generating a preformed cellular core structure comprising corrugations over these two faces forming the drains,
- the preformed cellular core structure being used in the step of manufacturing an element with a cellular structure.

The cellular core structure comprises a multitude of cells, each associated to one corrugation of each of the stabilization layers. Each corrugation is formed by an area of the stabilization layers incurved towards the inside of the cell.

According to yet another form, the step of manufacturing an element with a cellular structure comprises a substep of forming two preformed layers of structural plies before the step of manufacturing an element with a cellular structure so as to obtain two preformed layers of structural plies each having an embossed or corrugated surface intended to be positioned opposite a face of the cellular core structure to form the drains.

In one form, the substep of forming two preformed layers of structural plies comprises a step of positioning a punching grid or die on a mold, a step of positioning a layer of structural plies over the punching grid or die, a step of coverage with a counter-mold and a compression step to form a preformed layer of structural plies.

According to another form, the method for manufacturing a composite panel comprises a step of positioning several additional layers of fibers between the cellular core structure and each layer of structural plies. The additional layers of fibers are arranged so as to form interstices therebetween. The interstices form the drains.

According to another form, the method for manufacturing a composite panel comprises a step of forming channels on each of the faces of the cellular core structure before the step of manufacturing the element with a cellular structure. The channels form the drains.

Thus, the present disclosure provides a method enabling a simplified manufacture of a composite panel, by substantially reducing the number of manufacturing steps, in particular by avoiding a final step of gluing the elements together, while allowing ending up with a composite panel whose cells preserve the integrity thereof. The cells are not sealed by the resin.

The drains are integrated to the composite panel. They are formed and used during the manufacturing process, and then kept on the end product, without deteriorating the acoustic and structural performances of the composite panel.

The surface quality is obtained by the application of a second mold portion or counter-mold on the set.

This also reduces the risk of having skins with different surfaces due to different baking processes since the manufacturing method comprises only one single baking process.

In addition, fewer products are used, thereby reducing the environmental impact.

Less energy is consumed in the polymerization.

According to another form, the present disclosure concerns a composite panel comprising a cellular core structure interposed between two skins obtained by the manufacturing method as previously defined. Drains formed during the method are integrated into the composite panel.

The present disclosure also concerns an element with a cellular structure intended to be infused with a resin prior to a polymerization step in order to obtain a composite panel comprising a cellular central core interposed between two skins.

The element with a cellular structure comprises a cellular core structure disposed between two layers of structural plies intended to form the skins.

According to the present disclosure, the element with a cellular structure comprises drains to distribute the resin during the infusion. The drains have a geometry configured to provide draining of the resin in the element with a cellular structure during the infusion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
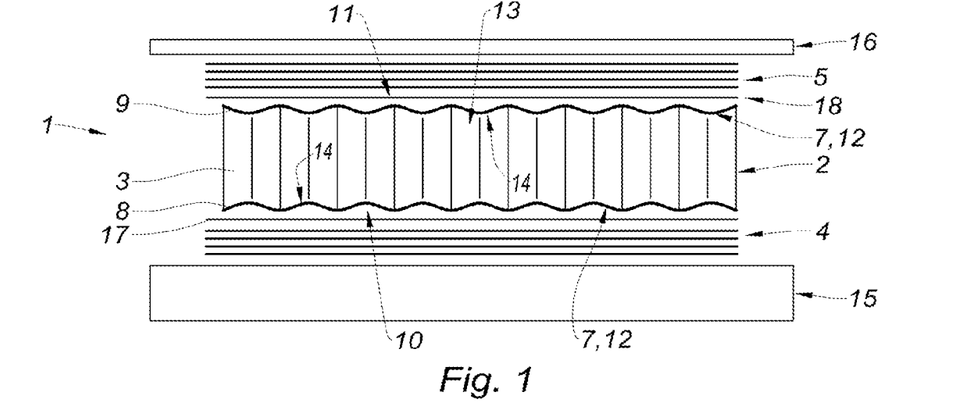
FIG. 1 is a schematic view of an element with a cellular structure during a step of manufacturing a composite panel according to one form of the present disclosure involving a stabilization method.

FIG. 1 illustrates a method for manufacturing a composite panel comprising a cellular central core interposed between two skins according to one form of the present disclosure.

The manufacturing method comprises a step of manufacturing an element with a cellular structure 1 comprising a cellular core structure 2 interposed between two layers of structural plies 4, 5, the structural plies forming the skins of the composite panel.

The element with a cellular structure 1 is an intermediate product used during this manufacturing step.

The cellular core structure 2 of the intermediate product and the cellular central core of the end product (the composite panel) comprise a network of cellular walls 3 forming cells 13 or cavities which may be shaped like a honeycomb for example.

The composite panel may be devoid of any aerodynamic face.

In one form, the composite panel comprises one or two aerodynamic face(s).

The skins are positioned opposite to one another on either side of the cellular central core of the composite so as to form the aerodynamic faces.

The use of a perforated aerodynamic or acoustic skin with a multitude of orifices enabling a fluidic communication between the outside and the inside of the cellular central core of the composite forms an acoustic composite panel that can be used as a flap or panel of a thrust reverser of a turbojet engine nacelle.

The manufacturing method comprises a step of positioning the element with a cellular structure 1 in a mold including a first mold portion 15 and a second mold portion 16.

The manufacturing method comprises a step of forming drains 7 on either side of the cellular core structure 2 and a step of infusing the element with a cellular structure 1 so as to impregnate it with a resin.

The manufacturing method comprises a step of carrying out a draining of the resin through the drains 7 in the element with a cellular structure 1 during the infusion step. The drains 7 have a geometry configured to provide draining of the resin and to impregnate the element with a cellular structure 1.

The manufacturing method comprises a step of polymerizing the impregnated element with a cellular structure so as to form the composite panel.

The resin and the components of the panel withstand an implementation temperature above 160° C.

A composite component with integrated drains 7, that is to say being part of the final structure of the composite and whose polymerization has been completed in one single step, is obtained.

The order of the steps hereinabove is not restrictive and may be different.

According to the form represented in FIG. 1, the drains 7 are obtained through a stabilization (or shape stabilization) method so as to form corrugations 12 along each face 10, 11 of the element with a cellular structure 1.

During the stabilization, the corrugations may be obtained by a pressure difference between the inside and the outside of the cellular core and fixed during a preliminary polymerization step.

More specifically, the method for manufacturing the composite panel comprises a preliminary step of manufacturing a tight cellular core structure before the step of manufacturing an element with a cellular structure 1 including a step of positioning a first stabilization layer 8 over a first face 10 of the cellular core structure 2 and a step of positioning a second stabilization layer 9 over a second face 11 of the cellular core structure 2.

In one form, the two stabilization layers 8, 9 are glued with adhesives on the peripheral edges of the cellular core structure 2 during the preliminary step of manufacturing the tight cellular core structure 2.

The tight cellular core structure 2 is an intermediate product which is used afterwards for the manufacture of the composite panel.

A first layer of dry structural plies 4 is drape-molded over the first mold portion 15.

Optionally, a first glass fabric 17 may be positioned over the first layer of structural plies 4.

The tight cellular core structure 2 is positioned over the first glass fabric 17.

Optionally, a second glass fabric 18 may be positioned over the tight cellular core structure 2.

A second layer of dry structural plies 5 is drape-molded over the second glass fabric 18.

An element with a cellular structure 1 is obtained comprising a cellular core structure 2 interposed between two layers of structural plies 4, 5 which is covered with the second mold portion 16.

Afterwards, the infusion and polymerization steps are applied.

The drains 7 are formed during the polymerization step during which the stabilization layers 8, 9 are deformed so as to form corrugations 12 along each face 10, 11 of the element with a cellular structure 1.

The cellular core structure 2 comprises a multitude of cells 13 each associated to one corrugation 12 of each of the stabilization layers 8, 9.

Each corrugation 12 is formed by an area 14 of the stabilization layers 8, 9 curved towards the inside of the cell 13. These corrugations 12 form drain channels allowing draining the resin during the infusion.

Figure 2:
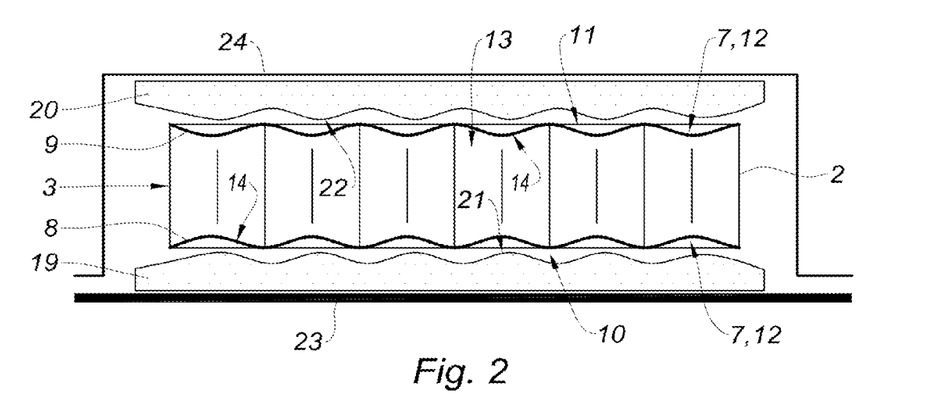
FIG. 2 is a schematic view of a cellular core structure during a step of manufacturing a preformed cellular core structure according to another form of the present disclosure.

According to another form illustrated in FIG. 2, the method for manufacturing a composite panel comprises a preliminary step of manufacturing a preformed cellular core structure 2 before the step of manufacturing an element with a cellular structure 1 including:

- a step of positioning a first deformable element 19 over a mold 23,
- a step of positioning a first stabilization layer 8 over the first deformable element 19,
- a step of positioning a first face 10 of the cellular core structure 2 over the first stabilization layer 8,
- a step of positioning a second stabilization layer 9 over a second face 11 of the cellular core structure 2,
- a step of positioning a second deformable element 20 over the second stabilization layer 9, each of the first and second deformable elements 19, 20 comprising a corrugated face 21, 22 intended to be in contact with the respective stabilization layers 8, 9, a step of positioning a counter-mold 24 over the second deformable element 20, and a vacuum baking step, generating a preformed cellular core structure 2 comprising corrugations 12 over these two faces 10, 11 forming the drains 7.

The first deformable element 19 conforms to the first face 10 of the cellular core structure 2 and the second deformable element 20 conforms to the second face 11 of the cellular core structure 2.

The first and second deformable elements 19, 20 consist of shape templates (textile mat ("breather" plies for example) or silicone mat (DAM plies for example).

In one form, a normal sheaving is performed on the first and second deformable elements 19, 20.

The set is baked under vacuum according to the known cycle of the stabilization layers 8, 9.

The obtained preformed cellular core structure 2 comprises a multitude of cells 13 each associated to one corrugation 12 of each of the stabilization layers 8, 9.

Each corrugation 12 is formed by an area 14 of the stabilization layers 8, 9 that have become tight, curved towards the inside of the cell 13. These corrugations 12 form drain channels allowing draining the resin during the infusion.

The preformed cellular core structure 2 is an intermediate product which is used afterwards in the step of manufacturing an element with a cellular structure 1.

During the manufacture of an element with a cellular structure 1, a first layer of structural plies 4 is positioned over a first mold portion 15.

Afterwards, the preformed cellular core structure 2 is positioned over the first layer of structural plies 4. The cellular core structure 2 rests on its first face 10.

A second layer of structural plies 5 is positioned over the second face 11 of the cellular core structure 2.

Afterwards, the second mold portion 16 is positioned on top of the second layer of structural plies 5 to close the mold.

Afterwards, the resin infusion and polymerization steps are carried out under vacuum and at high temperature, which in one form is above 160° C.

Figure 3:
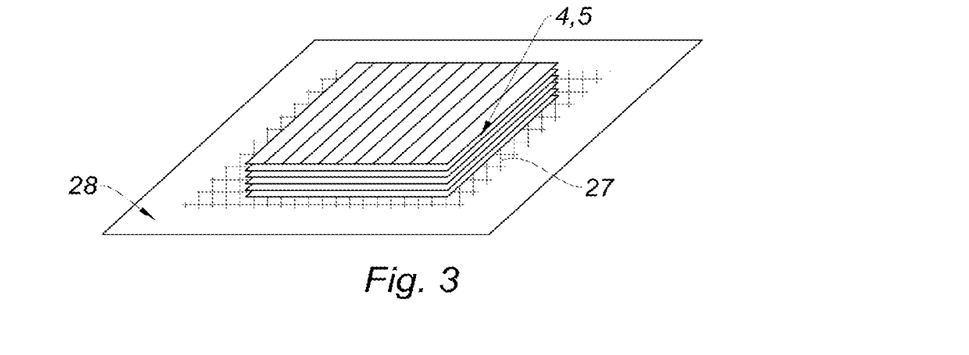
FIG. 3 is a perspective view of a layer of structural plies during a substep of forming two preformed layers of structural plies according to the present disclosure.
Figure 4:
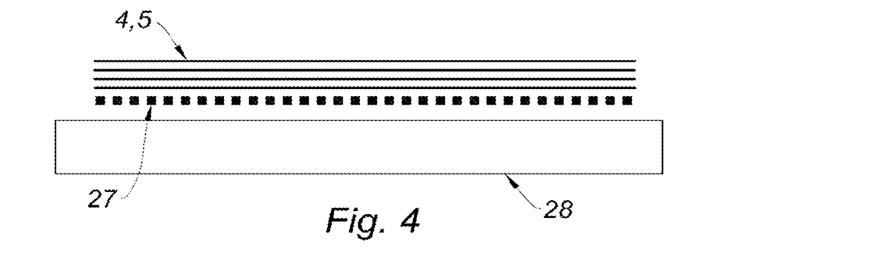
FIG. 4 is a profile view of the layers of structural plies of FIG. 3.
Figure 5:
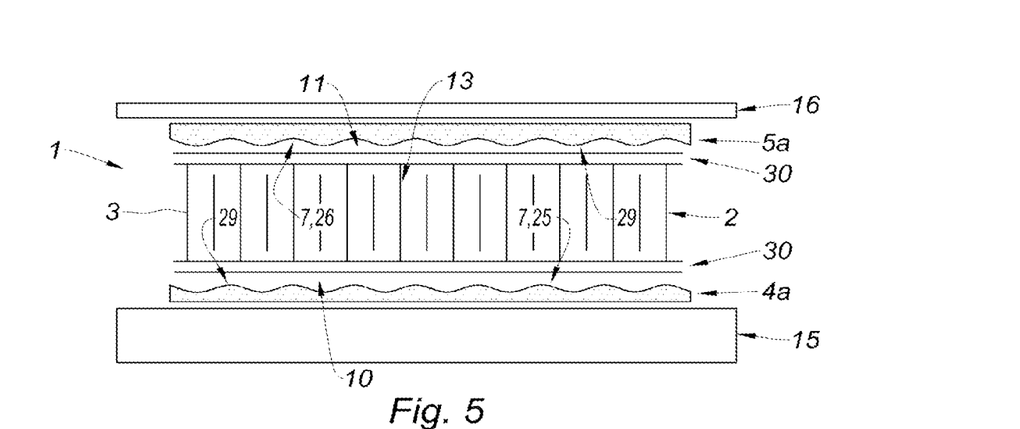
FIG. 5 is a schematic view of an element with a cellular structure during a step of manufacturing a composite panel according to one form of the present disclosure using the two preformed layers of structural plies of FIG. 3.

According to another form represented in FIGS. 3 to 5, the step of manufacturing an element with a cellular structure 1 comprises a substep of forming two preformed layers of structural plies 4a, 5a before the step of manufacturing an element with a cellular structure 1.

Each of the two preformed layers of structural plies 4a, 5a has an embossed or corrugated surface 25, 26 intended to be positioned opposite one face 10, 11 of the cellular core structure 2 to form the drains 7.

More specifically, during the substep of forming each of the two preformed layers of structural plies 4a, 5a, a punching grid or die 27 is set in place over a mold 28, as illustrated in FIGS. 3 and 4.

The punching grid or die 27 is non-adherent (made of Teflon for example) and comprises a gridding such as a 5×5 mm meshing, for example.

Each layer of structural plies 4, 5 is positioned over a respective punching grid or die 27 and may be formed by several powdered carbon films, for example.

A counter-mold covers the layer of structural plies 4, 5.

Each layer of structural plies 4, 5 is compacted to obtain a preform and therefore a preformed layer of structural plies 4a, 5a having an embossed or corrugated surface 25, 26 with drain channels 29.

Afterwards, the punching grid or die 27 is removed.

As illustrated in FIG. 5, during the manufacture of an element with a cellular structure 1, a first preformed layer of structural plies 4a is positioned over a first mold portion 15.

Afterwards, the cellular core structure 2 is positioned over the first preformed layer of structural plies 4a. The cellular core structure 2 rests on its first face 10.

A second preformed layer of structural plies 5a is positioned over the second face 11 of the cellular core structure 2.

Afterwards, the second mold portion 16 is positioned on top of the second preformed layer of structural plies 5a to close the mold.

Glass fabrics 30 may be positioned between each preformed layer of structural plies 4a, 5a and the cellular core structure 2.

Afterwards, the resin infusion and polymerization steps are carried out under vacuum and at high temperature, preferably above 160° C.

Figure 6:
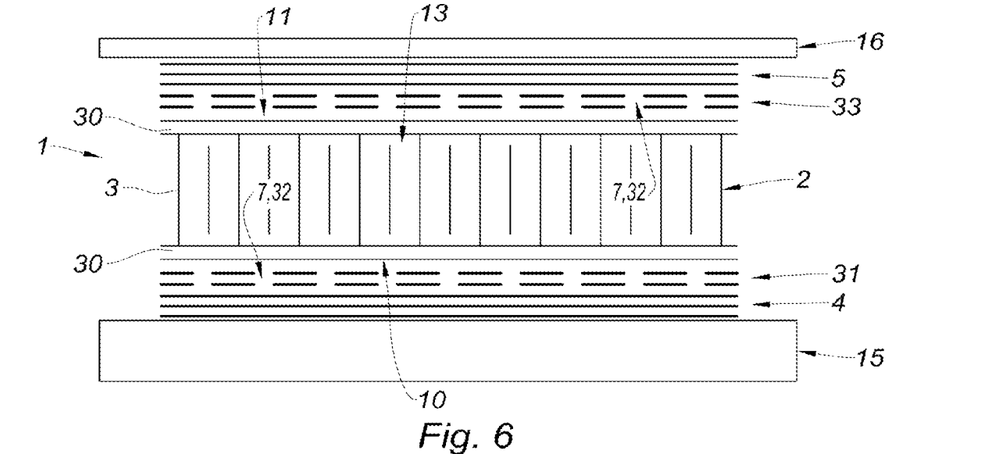
FIG. 6 is a schematic view of an element with a cellular structure during a step of manufacturing a composite panel according to another form of the present disclosure using additional layers of fibers.

According to another form represented in FIG. 6, the step of manufacturing an element with a cellular structure 1 comprises a step of positioning several additional layers of fibers 31, 33 between the cellular core structure 2 and each layer of structural plies 4, 5.

The additional layers of fibers 31, 33 are arranged so as to form drain interstices 32 or channels therebetween, forming the drains 7.

More specifically, during the manufacture of an element with a cellular structure 1, a first layer of structural plies 4 is positioned over a first mold portion 15.

A first layer of additional fibers 31 is drape-molded between the cellular core structure 2 and the first layer of structural plies 4.

The additional fibers are arranged so as to form interstices 32 or gaps between these fibers.

Afterwards, the cellular core structure 2 is positioned over the first layer of additional fibers 31. The cellular core structure 2 rests on its first face 10.

A second layer of additional fibers 33 is drape-molded over the second face 11 of the cellular core structure 2.

The additional fibers are arranged so as to form interstices 32 or gaps between these fibers.

The second layer of structural plies 5 is positioned over the second layer of additional fibers 33.

Afterwards, the second mold portion 16 is positioned on top of the second layer of structural plies 5 to close the mold.

Glass fabrics 30 may be positioned between each additional layer of fibers 31, 33 and the cellular core structure 2.

Afterwards, the resin infusion and polymerization steps are carried out under vacuum and at high temperature (preferably above 160° C.).

The geometry formed by the additional layers of fibers 31, 33 is configured to provide for draining of the resin during the infusion.

Figure 7:
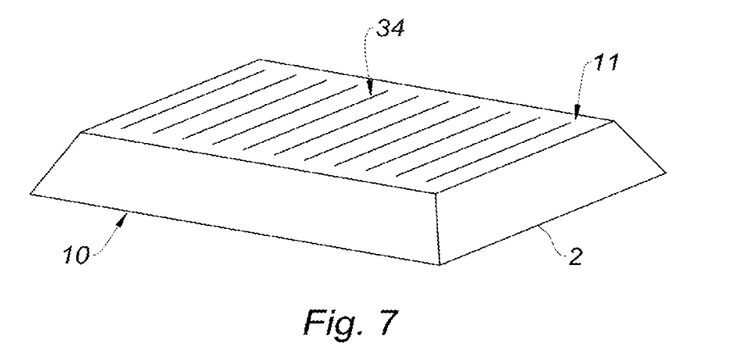
FIG. 7 is a perspective view of a cellular core structure after a step of forming channels on each of their faces according to the present disclosure.

According to another form represented in FIG. 7, the step of manufacturing an element with a cellular structure 1 comprises a step of forming channels 34 over each of the faces 10, 11 of the cellular core structure 2 before the step of manufacturing the element with a cellular structure 1.

The channels 34 form the drains 7.

Figure 8:
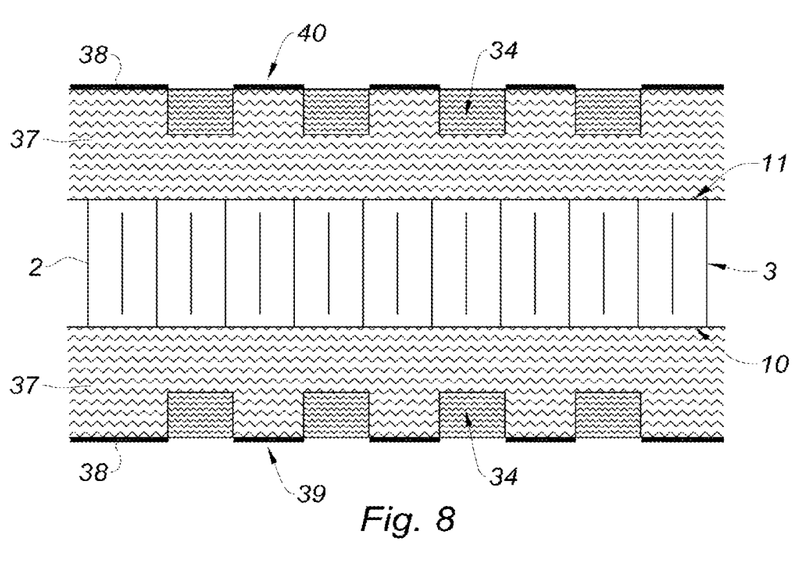
FIG. 8 is a schematic view of a cellular core structure obtained with the channels of FIG. 7.

During this step of forming channels 34, sealing layers 37 (composed for example by adhesive, glass, carbon plies, or others) are glued on the face 10, 11 of the cellular core structure 2, as represented in FIG. 8.

These sealing layers 37 may be protected by a fabric to be delaminated 38.

A counter-mold is positioned and pressed on the set which polymerizes in order to seal the cellular core structure 2 and bond the different layers together on the cellular core structure 2.

The channels 34 may be made by machining regular grooves in the direction of the infusion. Grooving may also consist of a gridding. Grooving is carried out after polymerization.

Alternatively, the channels 34 may be made by drape-molding of carbon, glass fibers or others spaced apart so as to obtain channels. Hence, the polymerization takes place after set-up of the fibers.

Alternatively, the channels 34 may be made by installing a punch (Teflon grid, for example) over the fabrics and beneath the counter-mold. The polymerization takes place after set-up of the punch.

Afterwards, the fabrics to be delaminated are removed.

FIG. 8 represents the obtained cellular core structure 2 with the channels 34.

Thus, the cellular core structure 2 comprises two grooved outer faces 39, 40.

Figure 9:
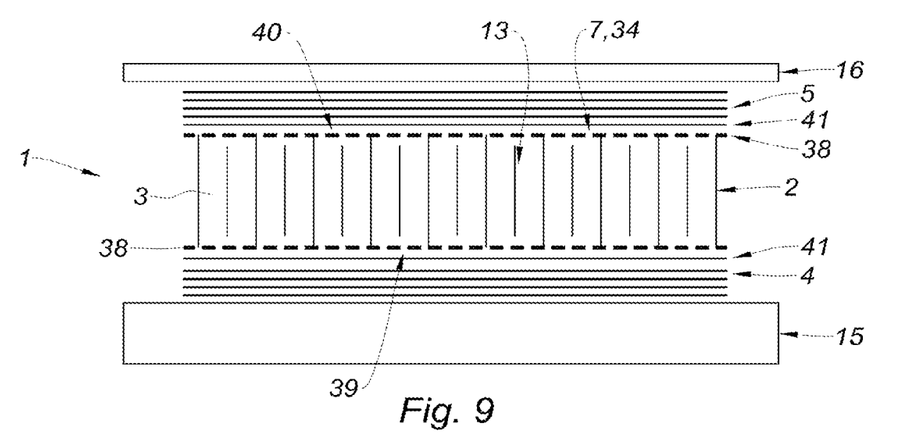
FIG. 9 is a schematic view of the cellular core structure comprising the channels of FIG. 7 during a step of manufacturing a composite panel according to another form of the present disclosure.

During the manufacture of an element with a cellular structure 1 as illustrated in FIG. 9, a first layer of structural plies 4 is positioned over a first mold portion 15.

Afterwards, the grooved cellular core structure 2 is positioned over the first layer of structural plies 4. The grooved cellular core structure 2 rests on its first grooved outer face 39.

A second layer of structural plies 5 is positioned over the second grooved outer face 40 of the cellular core structure 2.

Afterwards, the second mold portion 16 is positioned on top of the second layer of structural plies 5 to close the mold.

Optionally, a layer of glass fabrics 41 may be positioned between each layer of structural plies 4, 5 and the grooved cellular core structure 2.

Afterwards, the resin infusion and polymerization steps are carried out under vacuum and at high temperature.

Thus, the resin is drained through the channels 34.

The present disclosure is described in the foregoing as example. Of course, those skilled in the art are capable of carrying out different variants of the present disclosure yet without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing a composite panel the method comprising:
    manufacturing an element with a cellular structure comprising a cellular core structure interposed between two layers of structural plies, the two layers of structural plies forming two skins;
    positioning the element within a mold;
    forming drains on either side of the cellular core structure;
    infusing the element with a resin;
    draining the resin through the drains during the infusing, said drains having a geometry configured to provide said draining; and
    polymerizing the element to form the composite panel,
    wherein the drains are integrated to the composite panel after polymerizing and forming of the composite panel and,
    wherein the manufacturing of the element comprises forming two preformed layers of structural plies before the manufacturing of the element so as to obtain two preformed layers of structural plies, each preformed layer of structural plies having an embossed or corrugated surface positioned opposite a face of the cellular core structure to form the drains, wherein the forming of the two preformed layers of structural plies comprises positioning a punching grid or die on a mold, positioning a layer of structural plies over the punching grid or die, covering the structural plies with a counter-mold, and compressing the structural plies to form a preformed and embossed layer of structural plies, forming the drains.

* * * * *